Jan. 10, 1939. H. NUTT ET AL 2,143,113
CLUTCH DISK
Filed April 5, 1935 2 Sheets-Sheet 1
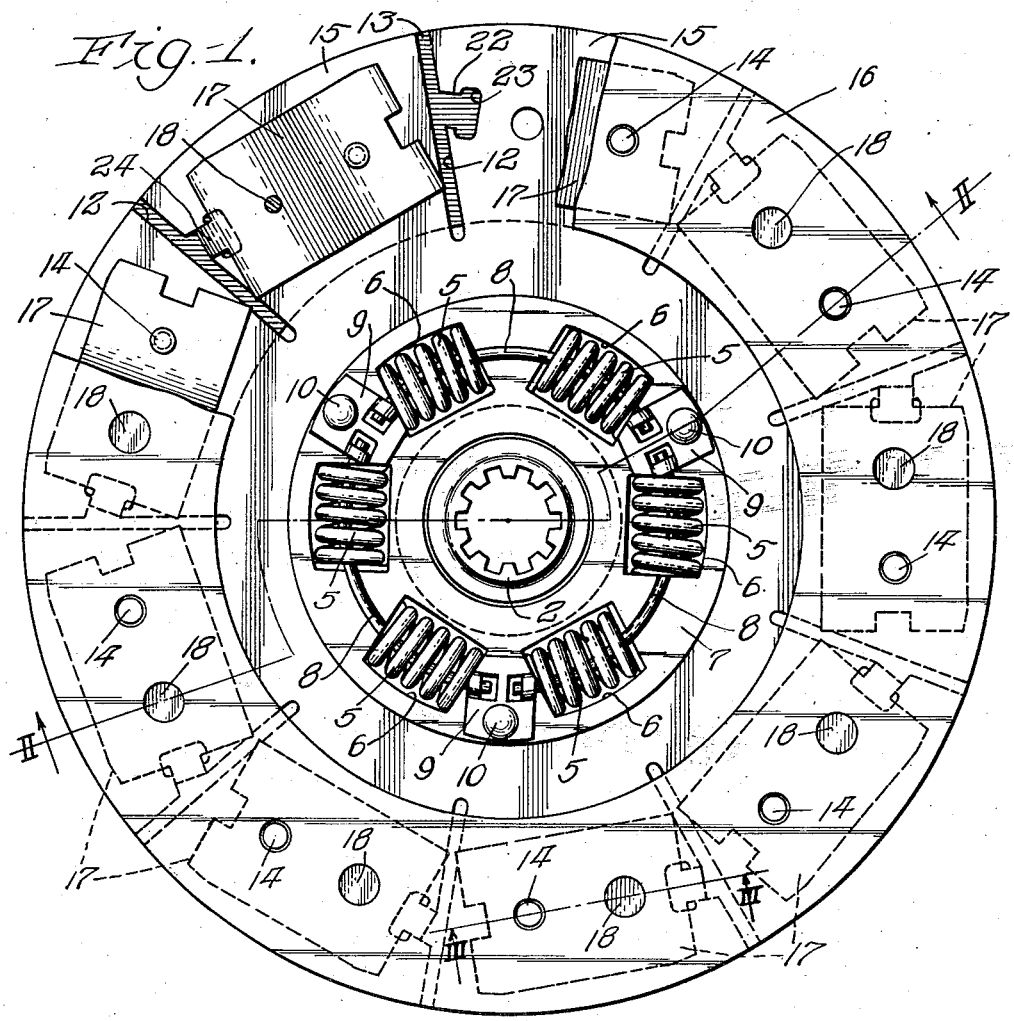
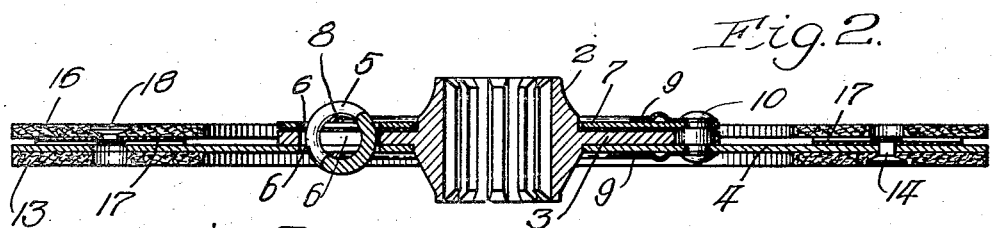
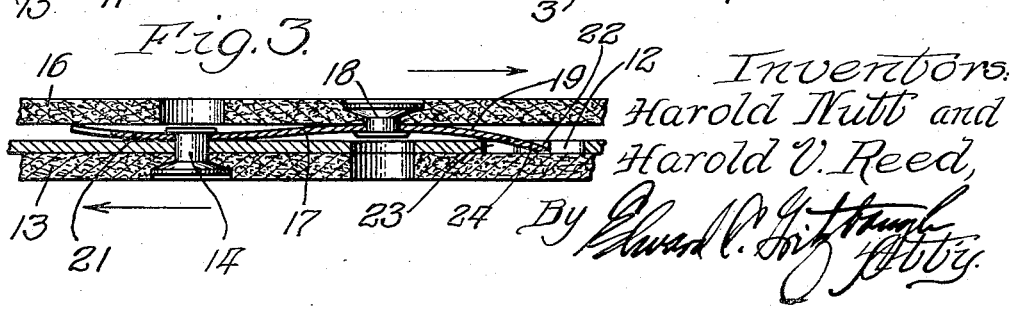
Inventors:
Harold Nutt and
Harold V. Reed,

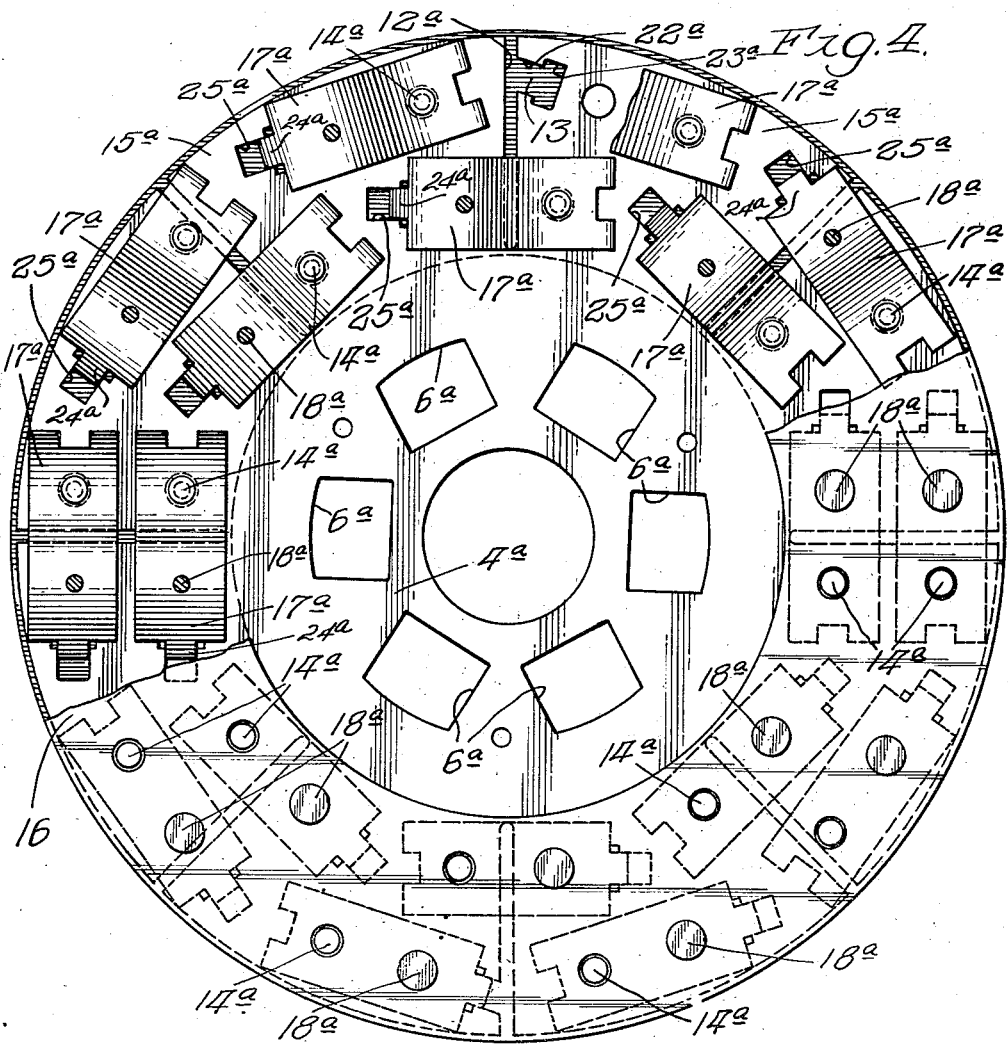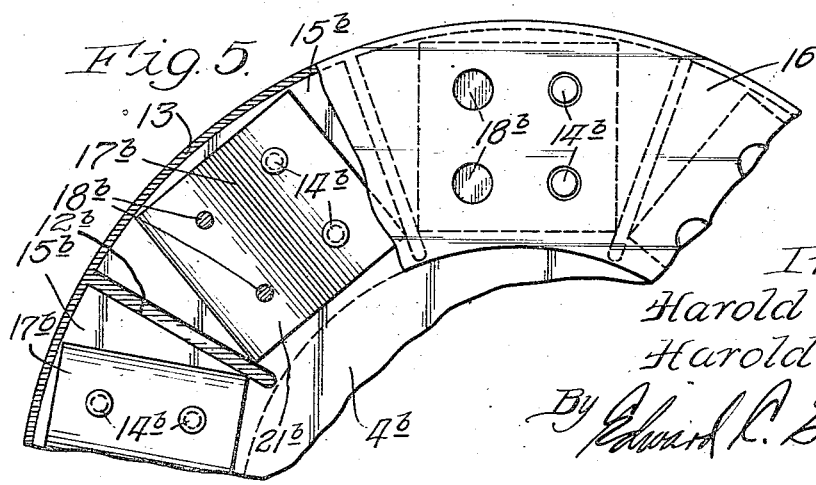

Patented Jan. 10, 1939

2,143,113

UNITED STATES PATENT OFFICE 2,143,113

CLUTCH DISK

Harold Nutt and Harold V. Reed, Chicago, Ill., assignors to Borg-Warner Corporation, Chicago, Ill., a corporation of Illinois Application April 5, 1935, Serial No. 14,768

14 Claims. (Cl. 192—107)

This invention relates to improvements in clutch disks and more particularly to driven clutch disks of the cushion type such as may be used in the clutches for motor vehicles.

An object of the invention is to provide an improved cushion type driven clutch disk.

Another object is to provide a driven clutch disk wherein the entire area of the friction facing thereof may have uniform contact with the surfaces of the driving assembly and wherein friction driving engagement may take place smoothly and quietly as the driving surfaces progress into engagement with the friction facings of the disk.

A further object is to provide an improved clutch disk wherein the cushioned friction facing may move in an annular path relative to the driven plate during compression thereby to relieve strain which might otherwise be present in the interconnecting cushion members.

Other objects, the advantages and uses of the invention will be apparent after reading the following specification and claims and after consideration of the drawings forming a part of the specification wherein:

Fig. 1 is a rear elevation of a driven clutch disk constructed in accordance with the invention, a part thereof being broken away;

Fig. 2 is a sectional view along the line II—II of Fig. 1;

Fig. 3 is a sectional view along the line III—III of Fig. 1;

Fig. 4 is a view similar to Fig. 1 of another form of the clutch disk, and

Fig. 5 is a fragmentary elevation of another form of the clutch disk structure.

With reference to Fig. 1 the clutch disk of the invention may comprise, as illustrated, a hub member 2 having a circumferential flange 3, a driven sheet steel plate 4 located concentrically of the axis of the hub 2 and having a torque transmitting connection with the hub through the medium of a plurality of compression springs 5. The springs 5 may be located in openings 6 formed in the plate 4, the hub flange 3 and a plate ring 7, as illustrated and retained in operative position relative to the plate and hub assembly, by a plurality of wire retainer members 8 arranged in pairs upon the opposed and outer sides of the plate 4 and plate ring 7, respectively. Clips 9 function securely to hold the retainers in place. Rivets 10 extending through the overlapping portions of the clutch plate, the plate ring and through enlarged openings in the hub flange serve to limit rotational movement between the clutch plate and hub and to secure the clips 9 in place.

The structure thus far described represents a commercial type of clutch disk dampening mechanism and though it smooths out the flow of power between the disk and the driven shaft, it does not form a part of our present improvement and, obviously, may be replaced if desired with any conventional hub-plate assembly.

The outer portion of the plate 4 may be formed with a plurality of radial slots 12 therethrough thus to divide the peripheral region of the plate into a plurality of equal sectors, thereby lending slight flexibility to the facing supporting portion of the plate. An annular friction facing 13 of fibrous material or the like may be secured directly to the plate 4 on one side thereof, as by rivets 14, one for each of the plate sectors 15. The facing 13 is thus rigidly mounted upon the plate. A second annular friction facing 16 is provided for the opposite side of the plate and is located normally at a slight distance away from the adjacent surface of the plate.

The facing 16 may be supported relative to the plate by a plurality of relatively thin, elongated, metal spring members 17, one for each of the sectors 15. The spring members 17 are preferably preformed in such manner as to present opposed convex cylindrical portions, as best illustrated in Fig. 3, one portion adjacent each of the ends thereof. Rivets 18 may be employed to secure the facing 16 to the convex portion 19 of each of the members 17. The oppositely disposed and convex portion 21 of each of the spring members 17 is secured to the clutch plate 4 by the adjacent rivet 14. It is thus apparent that one end portion of each of the spring members 17 is fixed to one of the sectors 15 of the clutch plate 4 and that the opposite end portion of each of the spring members is secured to the clutch facing 16 and that all of the spring members extend in the same direction relative to their points of support upon the plate 4 yieldingly to space the facing from the plate.

In order to prevent pivotal movement of the spring members upon the axis of the rivet 14, when under the influence of centrifugal force acting thereupon during rotation of the disk, slots 22 may be formed in each of the sectors 15 extending inwardly from the adjacent radial slot 12, the inner ends of which may be enlarged as shown at 23. The slots 22 thus arranged serve to receive tongues 24 formed upon the outer ends of each of the spring members 17, which tongues extend along the longitudinal axes of the members and, because of the cylindrical curvature of the portions 19 of the spring members, always lie within the confines of the slots 22 thus to restrain the spring members from pivotal movement about the axes of their respective supporting rivets 14.

A clutch disk constructed as described, provides a yielding cushion between the opposed clutch facings 13 and 16 which, with respect to the facing 16, permits of relative rotation between the facing and the clutch plate during the compression of the disk. This function of the cushioning structure serves to relieve the facing as well as the spring members 17 of strain which might otherwise occur during compression of the disk and also does away with the necessity for providing lost motion in the spring interconnecting means between the clutch facing and the plate, as has been heretofore proposed by those skilled in the art.

In operation the cushioning means functions to cause the friction surfaces of the facings 13 and 16 to contact uniformly with the cooperating surfaces of the driving members of the clutch as the clutch is engaged thus to minimize wear and to increase efficiency in operation thereof.

The action of the disk during compression is particularly smooth, largely so because of the relatively high flexibility of the spring members 17, which may be of considerably lighter stock than the steel plate 4, and yet which may satisfactorily carry the torque load impressed thereupon. Any movement of the spring members about the axes of the rivets 14 is prevented by the engagement between the tongues 24 and the slots 22, which permit the tongue-ends of the spring members to move only along paths which are normal to the radii of the circular plate 4. Such movement or elongation of the spring members takes place during compression of the disk as the opposed convex portions of the spring members are compressed.

In Fig. 4 we have illustrated another form of the cushioning means which differs from that disclosed in Figs. 1 to 3, inclusive, in that two sets of the spring members 17a are employed between the clutch plate 4a and the facing 16, each set arranged in annular array one concentric to the other. In this form of the disk the multiple array of the spring members 17a may necessitate the provision of openings 25a through certain of the sectors 15a of the plate, which openings have the same function as the slots 22a in receiving the tongues 24a of the spring members. While we have shown two rows of the spring member in the disk of Fig. 4, more than two such rows may be employed if desired. Whether two, or more, such rows be employed, it is desirable to form the spring members of lesser width in this form of the disk, in order to provide for their disposition within the area allotted to the annular friction facings.

It is contemplated that a clutch disk thus constructed may be employed in clutches requiring a relatively large friction area. The operation of the disk is substantially the same as that of the disk of Fig. 1.

In Fig. 5 we have illustrated another form of the clutch disk wherein the spring members 17b are relatively wide and each is fixed at one end to the clutch plate by two rivets 14b, the rivets further serving to secure the facing 13 to the plate 4b. This manner of securing the spring members to the plate obviates the necessity for providing the tongues 24 and cooperating slots 22 since the rivets 14b coact to prevent pivotal or rotary movement of the springs relative to the plate. In like manner the facing 16 may be secured to the oppositely curved cylindrical portion 21b of the spring members by pairs of rivets 18b.

While we have illustrated the invention as embodied in several forms, we reserve the right to make any changes in such forms or in the construction and arrangement of the parts which may be found to be necessary or desirable in adapting the invention to different kinds of clutches or for other purposes within the scope of the following claims.

We claim as our invention:

1. In a driven clutch disk, a substantially circular plate, means for mounting said plate upon a driven shaft, an annular friction facing member disposed in substantially parallel and spaced relationship with said plate and resilient cushion members interposed between said facing and said plate, each of said resilient members having one end portion secured to said plate and the other end portion slidably engaged with said plate and being so arranged relative to said plate and said friction member as to provide a non-yielding connection between said plate and said friction facing in a direction parallel with the adjacent radius of the plate and a yielding connection in directions circumferentially of the plate and normal to the plane of the plate.

2. In a clutch disk, a hub member adapted to be mounted upon a shaft, a substantially circular clutch plate concentrically mounted upon said hub member, a friction facing secured upon one side of said plate, a second friction facing disposed in substantially parallel relationship with said plate upon the opposite side thereof, resilient cushion members interposed between said last named friction facing with said plate, each of said resilient members having one end portion secured to said plate and the other end portion retained against lateral edgewise movement relative to the plate and being so arranged relative to said plate and the adjacent friction facing as to provide a non-yielding connection between said plate and said friction facing in a direction parallel with the adjacent radius of the plate and a yielding connection in other directions including a direction circumferentially of the plate.

3. In a clutch disk, a hub member adapted to be mounted upon a driven shaft, a substantially circular plate of relatively slight flexibility concentrically mounted upon said hub member, an annular friction facing disposed at one side of said plate and normally spaced therefrom, and a plurality of structurally independent resilient and relatively flexible members each fixed at one end portion only to said plate and interconnecting said facing and said plate to provide a cushion support for the facing relative to the plate, the opposite end portions of each of said resilient members being retained against lateral edgewise movement relative to said plate and free to move longitudinally edgewise relative to the plate.

4. In a clutch disk, a hub member adapted to be mounted upon a driven shaft, a substantially circular plate of relatively slight flexibility concentrically mounted upon said hub member, an annular friction facing disposed at one side of said plate and normally spaced therefrom, a plurality of resilient and relatively flexible members each fixed at one end portion only to said plate and interconnecting said facing and said plate to provide a cushion support for the facing relative to the plate, and positive means restraining the opposite end portions of said interconnecting members against movement under the influence of centrifugal force acting thereupon during rotation of said clutch disk.

5. In a clutch disk, a hub member, a substantially circular plate of relatively thick sheet metal of slight flexibility mounted upon said hub member, an annular friction facing member located at one side of said plate and normally spaced therefrom, and a plurality of structurally independent resilient cushion members of relatively thin spring steel of high flexibility interconnecting said plate and said facing to provide a yielding support for the facing relative to the plate, each of said cushion members being secured at one end portion to said plate and at the opposite end portion to said facing.

6. In a clutch disk, a hub member, a substantially circular plate of relatively slight flexibility mounted upon said hub member, an annular friction facing member located at one side of said plate and normally spaced therefrom, and a plurality of resilient cushion members of relatively high flexibility interconnecting said plate and said facing to provide a yielding support for the facing relative to the plate, each of said cushion members being secured at one end portion to said plate and at the opposite end portion to said facing and all extending in the same direction about the peripheral portion of the plate, and means forming a part of said cushion members and engageable with said plate to retain said opposite end portions against lateral edgewise movement.

7. In a clutch disk, a hub member adapted to be mounted upon a shaft, a substantially circular clutch plate concentrically mounted upon said hub member, a friction facing secured upon one side of said plate, a second friction facing disposed in substantially parallel relationship with said plate upon the opposite side thereof, and resilient cushion members interconnecting said last named friction facing with said plate, each of said cushion members being secured at one end portion to said plate and each being formed at its opposite end with a tongue slidably received in a slot formed in said plate whereby to provide a non-yielding connection between said plate and said second friction facing in a direction parallel with the adjacent radius of the plate and a yielding connection in other directions including a direction circumferentially of the plate.

8. In a clutch disk, a hub member, a substantially circular plate of relatively slight flexibility mounted upon said hub member, an annular friction facing member located at one side of said plate and normally spaced therefrom, and a plurality of resilient cushion members of relatively high flexibility interconnecting said plate and said facing, the ends of said cushion members adjacent to their points of attachment to said facing being formed with tongues slidably received in a slot formed in said plate.

9. In a clutch disk, a hub member, a substantially circular plate of relatively slight flexibility mounted upon said hub member, an annular friction facing member located at one side of said plate and normally spaced therefrom, and a plurality of resilient cushion members of relatively high flexibility interconnecting said plate and said facing to provide a yielding support for the facing relative to the plate, each of said cushion members being secured at one end portion to said plate and at the opposite end portion to said facing, the end of each of said cushion members adjacent to its point of attachment to said facing being formed with a tongue slidably received in a slot formed in said plate.

10. In a clutch disk, a substantially circular plate, a hub for mounting said plate upon a shaft, a friction facing member disposed in substantially parallel and normally spaced relationship with said plate, and resilient sheet metal cushion members, structurally independent of said plate, interposed between said facing and said plate, each of said cushion members having one end region slidably engaged with said plate but unattached thereto, having another region, circumferentially spaced from said end region, attached to said plate, and having a region attached to said facing but being unattached to said facing at any point circumferentially removed from said last mentioned region, whereby said cushion is so arranged relative to said plate and said friction facing as to provide a non-yielding connection between said plate and said friction facing in a direction parallel with the adjacent radius of the plate and a yielding connection between said facing and said plate in directions circumferentially of the plate and normal to the plane of the plate.

11. In a clutch disk, a hub member, a substantially circular plate of relatively thick sheet metal of slight flexibility mounted upon said hub member, a friction facing member disposed at one side of said plate and normally spaced therefrom, and a plurality of structurally independent resilient cushion members of relatively thin spring sheet metal of high flexibility, each of said cushion members having one region secured to the plate and another region, circumferentially removed from said first mentioned region, secured to said facing, and being adapted to freely elongate between said regions under compression, whereby said cushions constitute connections between said plate and said facing that are non-yielding radially, but yielding both circumferentially and in a direction at right angles to the plane of the plate.

12. In a clutch disk, a hub member, a cushion mounting plate secured upon said hub member, a friction facing disposed at one side of said plate and normally spaced therefrom, and a plurality of structurally independent cushion members of spring metal that is relatively thin and highly flexible in comparison to the thickness and flexibility of said plate, each of said cushion members having a single region of attachment to said plate and a single region of attachment to said facing, said regions being circumferentially separated and the cushion being circumferentially undulated between said regions so as to be adapted for circumferential elongation between said regions under pressure, whereby said cushion members constitute connections between said plate and facing that are non-yielding radially, but yielding both circumferentially and in a direction normal to the plane of the plate.

13. In a clutch disk, a hub member, a cushion mounting plate of relatively slight flexibility mounted upon said hub member, a friction facing disposed at one side of said plate and normally spaced therefrom, and a plurality of structurally independent cushion members of spring metal that is relatively thin and highly flexible in comparison to the thickness and flexibility of said plate, each of said cushion members having circumferentially spaced single regions of attachment to said plate and facing respectively and being formed between said regions for circumferential elongation under compression, whereby said cushions constitute connections between said plate and facing that are non-yielding radially, but yielding both circumferentially and in a direction normal to the plane of the plate.

14. In a clutch disk, a hub member, a cushion mounting plate mounted upon said hub member, a friction facing disposed at one side of said plate and normally spaced therefrom, and a plurality of structurally independent cushion members of spring metal that is relatively thin and highly flexible in comparison to the thickness and flexibility of said plate, each of said cushion members having an attachment to said plate that is non-yielding radially and having a circumferentially spaced attachment to said facing and being formed for circumferential elongation between the regions of attachment to the plate and facing respectively, the facing and plate being adapted to rotate relative to each other so as to allow said cushions to freely elongate under compression.

HAROLD NUTT.
HAROLD V. REED.